US008923257B2

(12) United States Patent
Montemurro et al.

(10) Patent No.: US 8,923,257 B2
(45) Date of Patent: Dec. 30, 2014

(54) METHODS AND APPARATUS TO DISCOVER NETWORK CAPABILITIES AVAILABLE VIA WIRELESS NETWORKS

(75) Inventors: Michael Montemurro, Toronto (CA); Stephen McCann, Rownhams (GB)

(73) Assignee: BlackBerry Limited, Waterloo, Ontario (CA)

( * ) Notice: Subject to any disclaimer, the term of this patent is extended or adjusted under 35 U.S.C. 154(b) by 631 days.

(21) Appl. No.: 12/893,835

(22) Filed: Sep. 29, 2010

(65) Prior Publication Data

US 2012/0076117 A1 Mar. 29, 2012

(51) Int. Cl.
*H04W 40/20* (2009.01)
*H04L 29/08* (2006.01)
*H04W 48/16* (2009.01)
*H04W 84/12* (2009.01)

(52) U.S. Cl.
CPC .............. *H04L 67/16* (2013.01); *H04W 84/12* (2013.01); *H04W 48/16* (2013.01)
USPC ........................................................ 370/338

(58) Field of Classification Search
CPC ....... H04W 48/16; H04W 84/12; H04L 67/16
USPC .......... 370/318, 329, 338, 401; 709/227, 249; 455/422
See application file for complete search history.

(56) References Cited

U.S. PATENT DOCUMENTS

| | | | |
|---|---|---|---|
| 2005/0169249 A1* | 8/2005 | Shirota et al. ................. | 370/352 |
| 2006/0160537 A1* | 7/2006 | Buckley et al. ............ | 455/435.2 |
| 2007/0242645 A1* | 10/2007 | Stephenson et al. .......... | 370/338 |
| 2007/0275701 A1 | 11/2007 | Jonker | |
| 2008/0298333 A1 | 12/2008 | Seok | |
| 2009/0010399 A1 | 1/2009 | Kim et al. | |
| 2009/0175250 A1* | 7/2009 | Mathur et al. ................ | 370/338 |
| 2009/0274094 A1 | 11/2009 | Engwer | |
| 2009/0276827 A1* | 11/2009 | Zheng ............................... | 726/1 |
| 2012/0076118 A1 | 3/2012 | Montemurro et al. | |

FOREIGN PATENT DOCUMENTS

| | | |
|---|---|---|
| EP | 1076463 | 2/2001 |
| KR | 2010030078 | 4/2001 |
| WO | 2010/008388 | 1/2010 |

OTHER PUBLICATIONS

IEEE Draft Standard for Information Technology, "Part 11: Wireless LAN Medium Access Control (MAC) and Physical Layer (PHY) specifications," IEEE std 802.11u/D12.0, Sep. 2010, 218 pages.
IEEE Draft Standard for Information Technology, "Part 11: Wireless LAN Medium Access Control (MAC) and Physical Layer (PHY) specifications," IEEE std 802.11u/D11.0, Jul. 2010, 219 pages.

(Continued)

*Primary Examiner* — Jae Y Lee
*Assistant Examiner* — Jean F Voltaire
(74) *Attorney, Agent, or Firm* — Hanley, Flight and Zimmerman, LLC

(57) ABSTRACT

Example methods and apparatus to discover network capabilities available via wireless networks are disclosed. A disclosed example method involves discovering first network capabilities by performing an exchange between a wireless terminal and an access point of a wireless local area network. The method also involves comparing the first network capabilities with cached network capabilities and joining the wireless terminal with the access point based on at least a portion of the first network capabilities matching at least a portion of the cached network capabilities.

24 Claims, 11 Drawing Sheets

(56) References Cited

OTHER PUBLICATIONS

Patent Cooperation Treaty, "Written Opinion of the International Searching Authority," issued by the International Searching Authority in connection with PCT application No. PCT/EP2011/052157, mailed on Aug. 4, 2011, (7 pages).
Patent Cooperation Treaty, "International Search Report," issued by the International Searching Authority in connection with PCT application No. PCT/EP2011/052157, mailed on Aug. 4, 2011, (4 pages).
Canpolat et al., "Network Selection—Normative text proposal," IEEE 802.11-06/1014r3, Sep. 17, 2006, XP-002478802, 34 pages.
McCann et al., "Emergency URN Information" IEEE 802.11-10/0026r2, Jan. 18, 2010, XP-002632593, 8 pages.
Patent Cooperation Treaty, "Written Opinion of the International Searching Authority," issued by the International Searching Authority in connection with PCT application No. PCT/EP2010/066663, mailed on Aug. 4, 2011, (8 pages).
Patent Cooperation Treaty, "International Search Report," issued by the International Searching Authority in connection with PCT application No. PCT/EP2010/066663, mailed on Aug. 4, 2011, (4 pages).
International Bureau, "International Preliminary Report on Patentability," issued in connection with PCT application U.S. Appl. No. PCT/EP2011/052159, issued Apr. 2, 2013 (7 pages).
International Bureau, "International Preliminary Report on Patentability," issued in connection with PCT application U.S. Appl. No. PCT/EP2011/052157, issued Apr. 2, 2013 (6 pages).
Canpolat et al., "TGu Single GAS Protocol," IEEE P802.11, Wireless LANs, IEEE 802.11-10/0266r9, published Mar. 18, 2010 (64 pages).
Mexican Institute of Industrial Property, "Office Action," issued in connection with Mexican Patent Application No. MX/a/2013/003654 on Mar. 21, 2014 (4 pages).
Korean Intellectual Property Office, "Office Action," issued in Korean Application No. 10-2013-7010837, on Feb. 17, 2014 (6 pages).
Japanese Patent Office, "Notice of Reasons for Rejection," issued in connection with Japanese Patent Application No. 2013-530633, mailed on Feb. 20, 2014 (7 pages).
United States Patent and Trademark Office, "Final Office Action," issued in connection with U.S. Appl. No. 12/893,842, on Jul. 26, 2013 (16 pages).
United States Patent and Trademark Office, "Non-Final Office Action," issued in connection with U.S. Appl. No. 12/893,842, on Nov. 29, 2012 (13 pages).
Australian Government, IP Australia, "Patent Examination Report No. 1," issued in connection with Australian Patent Application No. 2011307130 on Jun. 16, 2014 (3 pages).
Korean Intellectual Property Office, "Office Action," issued in connection with Korean Patent Application No. 10-2013-7010837, Aug. 20, 2014 (3 pages).
Taiwanese Patent Office, "Office Action," issued in connection with Taiwanese Patent Application No. 100135379 on Jul. 24, 2014 (6 pages).
Korean Intellectual Property Office, "Notice of Allowance," issued in connection with Korean Patent Application No. 10-2013-7010837, on Oct. 14, 2014 (3 pages).

* cited by examiner

NETWORK CAPABILITY PROFILE DATA STRUCTURE

ACCESS POINT

… (1)

METHODS AND APPARATUS TO DISCOVER NETWORK CAPABILITIES AVAILABLE VIA WIRELESS NETWORKS

FIELD OF THE DISCLOSURE

The present disclosure relates generally to network communications and, more particularly, to methods and apparatus to discover network capabilities available via wireless networks.

BACKGROUND

Wireless network deployments, such as wireless local area networks (WLANs), allow wireless terminals to access network and Internet services when within proximity of wireless communication signals of those wireless networks. Different WLANs provide different network capabilities for wireless clients. Such network capabilities may include access to particular subscription service provider (SSP) networks, roaming agreements to allow connections from wireless clients associated with different SSPs, authentication capabilities to enable secure communications, support for emergency services, support for particular types of multi-media access (e.g., audio and/or video streaming, downloading, etc.), and/or support for other types of network services. If a wireless client joins a WLAN that does not provide a particular network capability, the wireless client cannot use such capability while associated with that WLAN.

DETAILED DESCRIPTION

Figure 1:
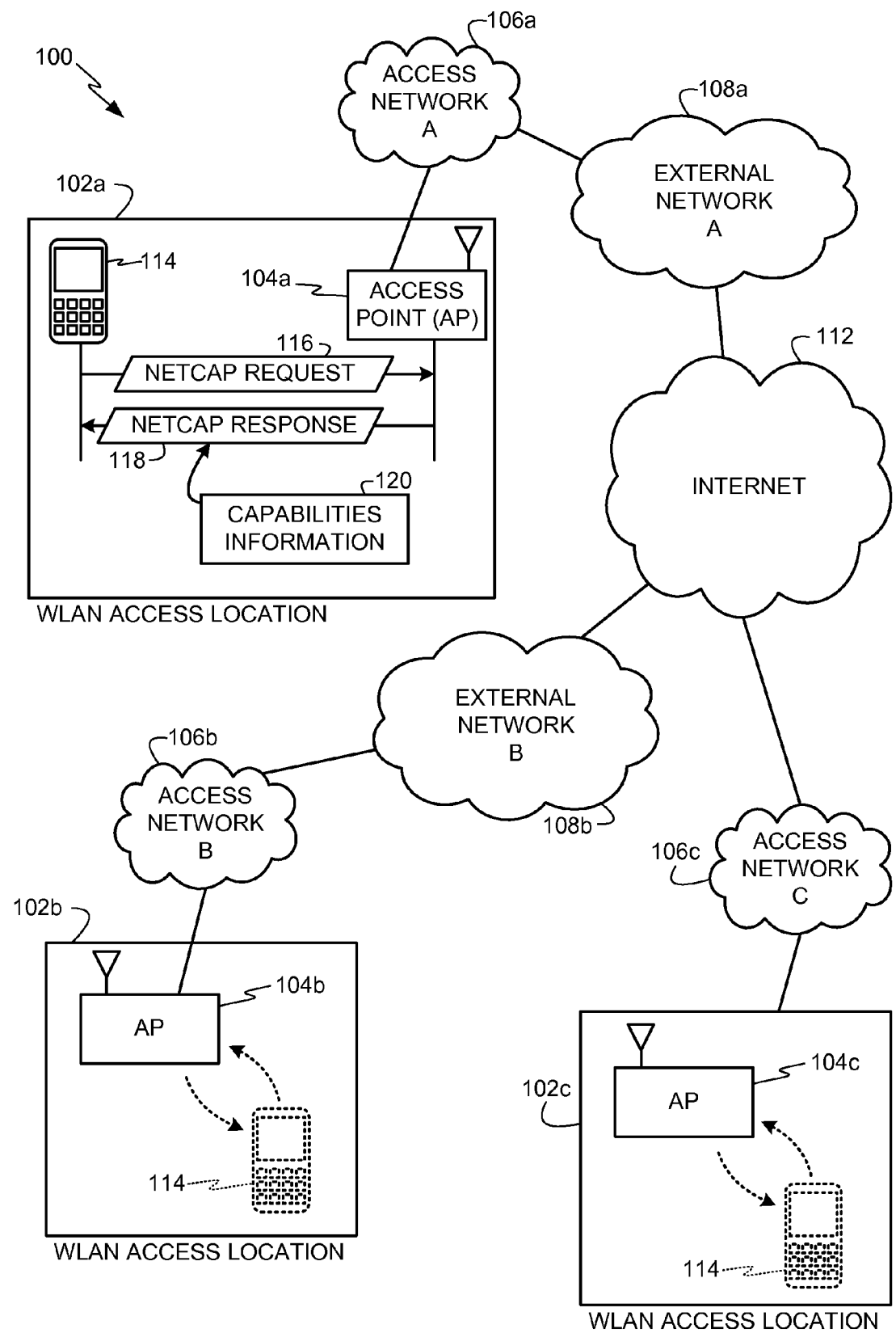
FIG. 1 depicts an example communication network in which a wireless terminal may communicate with a plurality of wireless local area networks.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used by wireless terminals to discover network capabilities that are available via wireless networks. Network capabilities are also referred to herein as network services supported by wireless networks. The example methods and apparatus described herein can be used in connection with mobile communication devices, mobile computing devices, or any other device capable of communicating wirelessly with a wireless network. Such devices, also referred to as terminals, wireless terminals, or user equipment (UE), may include mobile smart phones (e.g., a BlackBerry® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including other WLAN standards (e.g., any IEEE® 802.1x standard), personal area network (PAN) standards, wide area network (WAN) standards, or cellular communication standards.

Although the example methods and apparatus described herein may be implemented in any environment providing WLAN access for network connectivity, the example methods and apparatus can be advantageously implemented in WLAN access locations or environments in which it is expected that one or more users carrying respective wireless terminals will frequently connect to (or join) and disconnect from a WLAN as they enter and exit the WLAN access locations or environments. WLAN locations or environments are sometimes known as "hotspots" in reference to a location or environment that is within communication reach of WLAN signals. Such example WLAN locations or environments include coffee shops, retail stores, educational facilities, office environments, airports, public transportation stations and vehicles, hotels, etc. Such WLANs are often implemented as access networks that provide access to the Internet and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In this manner, a subscriber/user subscribed to such a service can use wireless network access and/or Internet-access services based on such a subscription when the subscriber is in communication proximity of the WLAN with an appropriate wireless terminal. In some instances, different WLANs may provide access to different types of network capabilities. For example, some WLANs may provide access to particular subscription service provider (SSP) networks, while others do not. In addition, some WLANs may support roaming agreements to allow connections from wireless terminals associated with different SSPs. Also, some WLANs may provide connection authentication capabilities to enable secure communications, may support particular emergency services, and/or may support particular types of multi-media access (e.g., audio and/or video streaming). WLANs may additionally or alternatively support other types of network access capabilities.

Known techniques for discovering network capabilities or network services available via WLANs can be time consuming and can adversely affect power consumption (and, thus, battery charge) of mobile devices. In addition, the user experience of known techniques or standards for associating a wireless terminal with a WLAN hotspot can be frustrating when network capabilities required by a wireless terminal and/or desired by a user of the wireless terminal are lacking via the WLAN hotspot. For example, known techniques for associating a wireless terminal with a WLAN involve the wireless terminal passively or actively scanning to discover one or more WLANs. The wireless terminal then selects a WLAN to join (e.g., based on advertised WLAN network properties such as a service set identifier (SSID), an encryption mode (e.g., wireless encryption protocol (WEP), Wi-Fi protected access (WPA), etc.), received signal strength indication (RSSI) and joins the selected WLAN. After joining the WLAN, known techniques may then be used to discover network capabilities available via the WLAN. However, if network capabilities required by the wireless terminal and/or desired by a user of the wireless terminal are not available, the WLAN association would be undesirable, yet the processing power and time for associating with the WLAN would already have been expended.

Unlike known techniques for discovering network capabilities, the example methods and apparatus described herein may be used to perform queries during a network discovery process to discover network capabilities available via WLANs. In this manner, a wireless terminal may obtain information on network capabilities made available by WLANs to determine, based on the network capabilities information, whether to continue with a connection process to join the wireless terminal with a WLAN. In accordance with the example techniques described herein, wireless terminals may request network capabilities information from WLANs using an Access Network Query Protocol (ANQP). The ANQP supports information retrieval from an Advertisement Server that supports a Generic Advertisement Service (GAS). ANQP and GAS are defined in IEEE® 802.11u. Additionally or alternatively, other query protocols (e.g., Registered Location Query Protocol (RLQP) as defined in IEEE® 802.11af, Hotspot Query Protocol (HSQP), and Online Signup Advertisement Protocol (OSAP) as defined in the Wi-Fi Alliance) may also be used in a similar manner to ANQP. An example ANQP exchange involves a requesting station (STA) (e.g., a wireless terminal) querying another STA (e.g., a WLAN access point (AP)) for information such as network capabilities information. The queried or receiving STA can respond to the received query with the requested information. The queried or receiving STA can generate the response information with or without proxying the query to a server in an external network (e.g., an SSP network). For example, an external network connected to a queried WLAN may have particular network capabilities accessible via the WLAN and of which a querying wireless terminal should be made aware. Although example methods and apparatus are described herein in connection with ANQP and GAS, other query protocols and information exchange services may alternatively or additionally be used.

To facilitate selections of WLANs as candidates for association, a wireless terminal may locally store one or more network capabilities profiles, each of which may define a different set of network capabilities. In this manner, when the wireless terminal receives information indicative of network capabilities that are available via a WLAN, the wireless terminal may compare the network capabilities to its stored network capabilities profiles. Network capabilities profiles specifying network capabilities or minimum network capabilities requirements that match the network capabilities of the WLAN can be identified by the wireless terminal as indicating that the WLAN is a suitable candidate to join. If the wireless terminal finds that the WLAN is suitable to join, the wireless terminal may proceed with joining the WLAN.

A wireless terminal may join a WLAN using a manual mode (e.g., in response to a user selection of one of a plurality of available WLANs) or using an automatic mode. In the illustrated examples described herein, an automatic mode involves a wireless terminal selecting a WLAN candidate based on a filtering scheme. For example, network capabilities profiles stored in a wireless terminal may be assigned ranking levels (e.g., by a user, the wireless terminal, an SSP, etc.) such that the wireless terminal can select a highest ranking one of the network capabilities profiles that meets at least a minimum quantity of network capability matches. In some example implementations, the automatic mode of joining a WLAN may be advantageously used in connection with wireless terminals that do not provide displays or user-input interfaces to allow users to enter WLAN selections. For example, an 802.11-based, wireless Ethernet portable music player may provide a user interface to enable selecting streaming music stations, but the user interface may not be sufficiently sophisticated to enable other types of user-entered information (e.g., WLAN selection). However, the methods and apparatus described herein can enable such a portable music player to join a WLAN hotspot when the portable music player has stored therein a network capabilities profile having a minimum quantity of matches with network capabilities available via the WLAN hotspot.

In some example implementations, the network capability discovery techniques described herein may be used for network discovery instead of SSID-based network discovery. For example, rather than using SSIDs as the primary mode for network discovery, a wireless terminal may use network capabilities information received from APs and its stored WLAN profiles to determine when it is in the vicinity of WLANs suitable for association.

Turning now to FIG. 1, an example communication network 100 in which the example methods and apparatus described herein may be implemented is shown. As shown in FIG. 1, the example communication network 100 includes a plurality of WLAN access locations 102*a-c* having respective access points 104*a-c* that provide access to respective access networks 106*a-c*. In the illustrated example, the access network A 106*a* provides access to an external network A 108*a* and the access network B 106*b* provides access to an external network B 108*b*. In the illustrated example, each of the external networks A 108*a* and B 108*b* may be a subscription service provider (SSP) network owned and/or operated by data subscription service providers, Internet subscription service providers, media (e.g., audio/video) subscription service providers, wireless communications subscription service providers, or any combination thereof. In the illustrated example, the external networks A 108*a* and B 108*b* are connected to the Internet 112 and may, for example, provide subscription-based Internet access to wireless terminals. In some example implementations, roaming agreements between different SSPs may enable the external networks A 108a and B 108b to support roaming connections for wireless terminals associated with other SSPs.

Unlike the access networks A 106a and B 106b that do not connect directly to the Internet 112, the access network C 110 is connected directly to the Internet. Thus, the access network C 106c may be a public network, while the access networks A 106a and B 106b may be private networks.

Although not shown, each of the APs 104a-c and a wireless terminal 114, that communicates with the APs 104a-c, is provided with a station (STA), which is the interface or component, such as a network adapter or network interface card (NIC), that connects to a wireless medium.

Each of the access networks 106a-c and the external networks 108a-b may be associated with and/or provide access to different network capabilities. The network capabilities may include roaming relationships, network services, multimedia access services, supported authentication and/or security methods, emergency services, etc. The network capabilities may be selected by respective owners or operators of the networks 106a-c, 108a, and 108b based on different factors such as, for example, subscription usage plans, desired security levels, business objectives, roaming agreements, supported emergency services, supported multi-media access, available Internet access, etc. For instance, if an SSP associated with the external network A 108a only allows access by subscribers of its services, the external network A 108a may advertise that it does not support roaming connections.

The example methods and apparatus described herein may also enable the wireless terminal 114 to join different APs (e.g., the APs 104a-c) based on different network capabilities profiles stored in the wireless terminal 114. That is, when the wireless terminal 114 is moved to a different one of the WLAN access locations 102a-c, the wireless terminal 114 can dynamically discover network capabilities available at the WLAN access locations 102a-c and join any suitable one of the APs 104a-c even when the wireless terminal 114 has not previously encountered the APs 104a-c or the network capabilities available via the APs 104a-c have changed since a previous connection between the wireless terminal 114 and the APs 104a-c.

As shown generally in connection with the WLAN access location 102a, the wireless terminal 114 can send a network capabilities request (NETCAP REQUEST) message 116 to the AP 104a and receive a network capabilities response (NETCAP RESPONSE) message 118 including network information 120 indicating one or more network capabilities (of the access network A 106a and/or the external network A 108a) available via the access point 104a. The wireless terminal 114 and the AP 104a may exchange the NETCAP REQUEST 116 and NETCAP RESPONSE 118 using the ANQP protocol after the wireless terminal 114 receives an SSID of the AP 104a or without the wireless terminal 114 needing to have received the SSID. In addition, the NETCAP REQUEST 116 and the NETCAP RESPONSE 118 may be exchanged at a media access control (MAC) sub-layer of the well-known Open Systems Interconnection (OSI) Reference Model without needing to use operations at or above an internet protocol (IP) layer (i.e., a network layer) nor needing to otherwise provide access to the IP layer while discovering network capabilities available via the AP 104a.

Discovering network capabilities using messages exchanged at or above the network layer requires relatively more processing power of a wireless terminal than implementing processes at the MAC sub-layer. Mobile wireless terminals (e.g., the wireless terminal 114 of FIG. 1) such as mobile smart phones, PDA's, etc. often have relatively limited processor cycles and less available electrical power than fixed-location computing devices powered using alternating current (AC) electricity sources. The example methods and apparatus described herein can be advantageously used to configure, design, or otherwise engineer mobile wireless terminals to operate more efficiently (i.e., do more with fewer processor cycles) and, thus, reduce battery power use. That is, the example methods and apparatus described herein can be advantageously used to promote mobile wireless terminal designs that consume relatively less power and operate relatively more efficiently. For example, low-level resource operations at the MAC sub-layer require relatively fewer system resources than user-interface-intensive and operating system (OS)-intensive operations (e.g., web-browser operations) at an application layer of the OSI Reference Model.

Another example advantage of discovering network capabilities available via APs using the MAC sub-layer is that a network capability discovery process can, without user involvement or with minimal user involvement, determine whether an AP is a suitable candidate for association based on minimal requirements of network capabilities profiles stored in the wireless terminal 114. For example, if the AP 104a advertises that it does not support roaming and the wireless terminal 114 would need to join the AP 104 under a roaming policy, the wireless terminal 114 can be configured to ignore the presence of the AP 104a because the wireless terminal 114 would be denied network access via the AP 104a. In some example implementations, the wireless terminal 114 can be configured to not inform its user of the presence of the AP 104a during a WLAN discovery process when it would not be possible for the wireless terminal 114 to connect to the AP 104a without minimum network capabilities required by the network capabilities profiles of the wireless terminal 114. Such example implementations substantially reduce or eliminate user frustration because the user would not need to engage in any attempts to join a particular AP when the AP does not meet the minimum network capability requirements of the wireless terminal 114.

Although an SSID is used in connection with the some example implementations described herein, an AP may alternatively be configured to broadcast a Homogeneous Extended Service Set Identifier (HESSID). An HESSID includes an SSID associated with a particular AP and a network identification corresponding to a supported external network (e.g., a SSP network). For instance, if the AP 104a of FIG. 1 were configured to broadcast an HESSID, it would include the SSID of the AP 104a and the network identification corresponding to the external network A 108a.

Other example advantages of the example techniques described herein result from the wireless terminal 114 discovering network capabilities each time it encounters an AP. In this manner, the wireless terminal 114 need not be preprogrammed to know network capabilities available via different APs. In addition, network capabilities of different networks (e.g., the access networks 106a-c, 108a, and 108b) may be changed at any time because wireless terminals can discover the changed network capabilities anew each time the wireless terminals discover (or re-discover) the networks.

Figure 2:
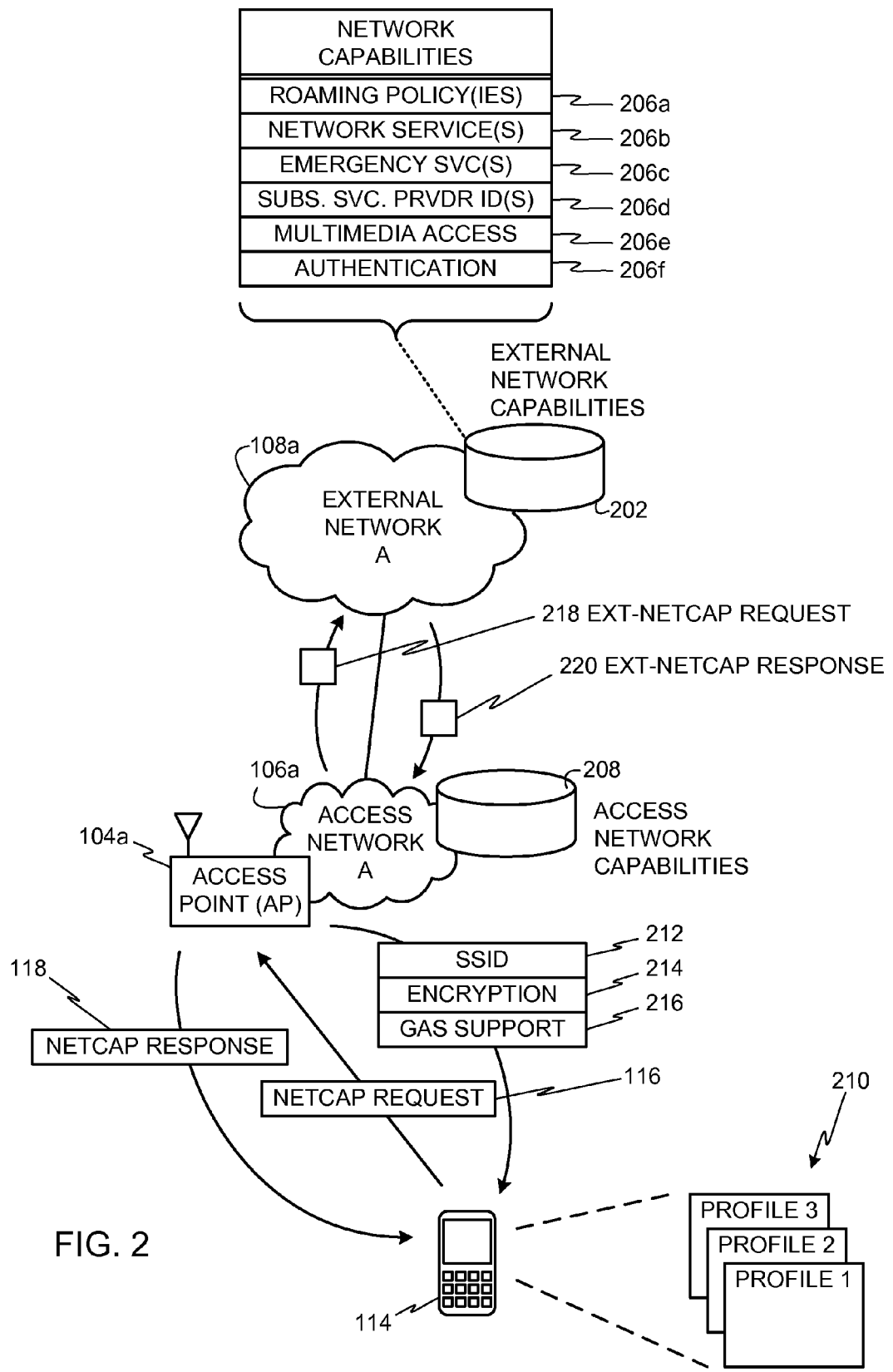
FIG. 2 depicts a portion of the example communication network of FIG. 1 in which the wireless terminal may discover example network capabilities that may be accessed via one of the wireless local area networks of FIG. 1.

FIG. 2 depicts a portion of the example communication network 100 of FIG. 1 in which the wireless terminal 104 may discover example network capabilities that may be accessed via the AP 104a. Although not shown, the wireless terminal 104 may discover network capabilities available via the APs 104b and 104c or any other AP using similar or identical techniques as described in connection with FIG. 2. In the illustrated example of FIG. 2, the external network A 108a includes an external network capabilities data store 202 to store network capabilities 206a-f of the external network A 108a. In the illustrated example, the network capabilities 206a-f include one or more roaming policies 206a, network service(s) capabilities 206b, emergency services support 206c, subscription service provider (SSP) identifier(s) 206d, multimedia access types 206e, and authentication methods 206f.

In the illustrated example, the one or more roaming policies 206a may be based on agreements between the SSP(s) of the external network A 108a and one or more other SSP(s) to allow wireless terminals to join the access network 106a under a roaming mode and, in turn, the external network A 108a. The network service(s) 206b may identify one or more network services (e.g., Internet connectivity, media streaming, secure protocols, no payment required, etc.) supported for communication with or via the external network A 108a. The emergency service(s) 206c may indicate the types of emergency services that are supported or provided by the external network A 108a. The SSP ID(s) 206d identify one or more SSPs that support or provide service via by the external network A 108a. A wireless terminal associated with a service subscription of an SSP that supports or provides service via the external network A 108a may join the access network A 106a to access the external network A 108a without requiring a roaming agreement. The multimedia access types 206e indicate the types of multimedia (e.g., video, audio, IP television (IPTV), etc.) that may be accessed via the external network A 108a. The authentication methods 206f may include identifiers of one or more authentication methods supported by the external network A 108a. An example authentication method is an Extensible Authentication Protocol (EAP) method. Known EAP methods include EAP-WISP (wireless internet service provider), EAP-MD5, EAP-OTP, EAP-GTC, EAP-TLS, EAP-IKEv2, EAP-SIM, EAP-AKA, EAP-FAST, EAP-TTLS, and PEAP. Each EAP method can be identified using a corresponding integer-format value assigned by an industry-standard resource coordination body such as the Internet Assigned Numbers Authority (IANA) (http://www.iana.org). Other EAP methods can also include vendor-specific methods.

In the illustrated example, the access network A 106a is provided with an access network capabilities data store 208 to store network capabilities of the access network A 106a. Although not shown, the access capabilities stored in the access network capabilities data store 208 may be of the same type as the network capabilities 206a-f stored in the external network capabilities data store 202 or may be of any other suitable types of network capabilities.

In the illustrated example, the network capabilities 206a-f and network capabilities stored in the access network capabilities data store 208 may be organized using an extensible markup language (XML) structure. In this manner, the AP 104a and the wireless terminal 114 can exchange registration requirements and registration information using the XML format. Alternatively, the network capabilities 206a-f and network capabilities stored in the access network capabilities data store 208 can be organized as sets of enumerated types, and the AP 104a and the wireless terminal 114 can exchange registration requirements and registration information using a type-length-value (TLV) structure format. For example, the AP 104a can encapsulate ones of the network capabilities in TLV type structures for communication to the wireless terminal 114 (e.g., via the NETCAP RESPONSE 118).

In the illustrated example of FIG. 2, the wireless terminal 114 stores network capabilities profiles 210, each of which may define a different set of network capabilities. The wireless terminal 114 may use the network capabilities profiles 210 to identify suitable WLAN candidates that the wireless terminal 114 may join. In some example implementations, each of the network capabilities profiles 210 may be assigned a respective ranking so that the wireless terminal 114 may perform a ranking process when a WLAN (e.g., the access network A 106a) has network capabilities that meet a minimum capabilities requirement of more than one of the network capabilities profiles 210. Example implementations of the network capabilities profiles 210 are described below in connection with FIGS. 3 and 4.

In the illustrated example of FIG. 2, the wireless terminal 114 uses the network capabilities profiles 210 during a network discovery process to determine whether any APs within a wireless communication vicinity of the wireless terminal 114 are suitable candidates for association. As shown in FIG. 2, during a network discovery process, the wireless terminal 114 may receive an SSID 212 and an encryption mode status 214 from the AP 104a. In the illustrated example, the encryption mode status 214 indicates whether an encryption mode (e.g., wireless encryption protocol (WEP), Wi-Fi protected access (WPA), etc.) is enabled on the AP 104a. Although not shown, the wireless terminal 114 may also simultaneously receive other SSIDs and encryption mode statuses from other nearby APs. In some example implementations, the AP 104a may also communicate a GAS support indicator 216 (typically implemented as an Interworking element in the beacon or probe response of an IEEE® 802.11 WLAN) to the wireless terminal 114, as shown in FIG. 2. The GAS support indicator 216 indicates that the access network A 106a supports GAS. The wireless terminal 114 may use this information to communicate with the AP 104a using protocols transported over GAS (e.g., ANQP messages). If a WLAN does not support GAS, it will not transmit the GAS support indicator 216.

In some example implementations, after receiving the SSID 212 and the encryption mode status 214 (and the GAS support indicator 216, if applicable), the wireless terminal 114 sends the NETCAP REQUEST 116 to the AP 104a to request network capabilities that are available via the access network A 106a. In the illustrated example, the network capabilities may be provided by the access network A 106a and/or the external network A 108a. If the external network A 108a provides some network capabilities, the access network A 106a may relay, forward, or otherwise send an external network capabilities request (EXT-NETCAP REQUEST) 218 to the external network A 108a in response to receiving the NETCAP REQUEST 116 from the wireless terminal 114. In response to the EXT-NETCAP REQUEST 218, the external network A 108a sends its network capabilities (e.g., one or more of the network capabilities 206a-f) to the access network A 106a via an EXT-NETCAP RESPONSE 220.

The access network A 106a forms the NETCAP RESPONSE 118 to include the network capabilities of the external network A 108a and any network capabilities provided by the access network A 106a. The AP 104a then sends the NETCAP RESPONSE 118 to the wireless terminal 114 to inform the wireless terminal 114 of the network capabilities that are available via the access network A 106a. The wireless terminal 114 may then compare the received network capabilities with network capabilities indicated in each of its network capabilities profiles 210 to determine whether minimum network capability requirements are met for any of the network capabilities profiles 210 to indicate that the access network A 106a is a suitable candidate for association.

Figure 3:
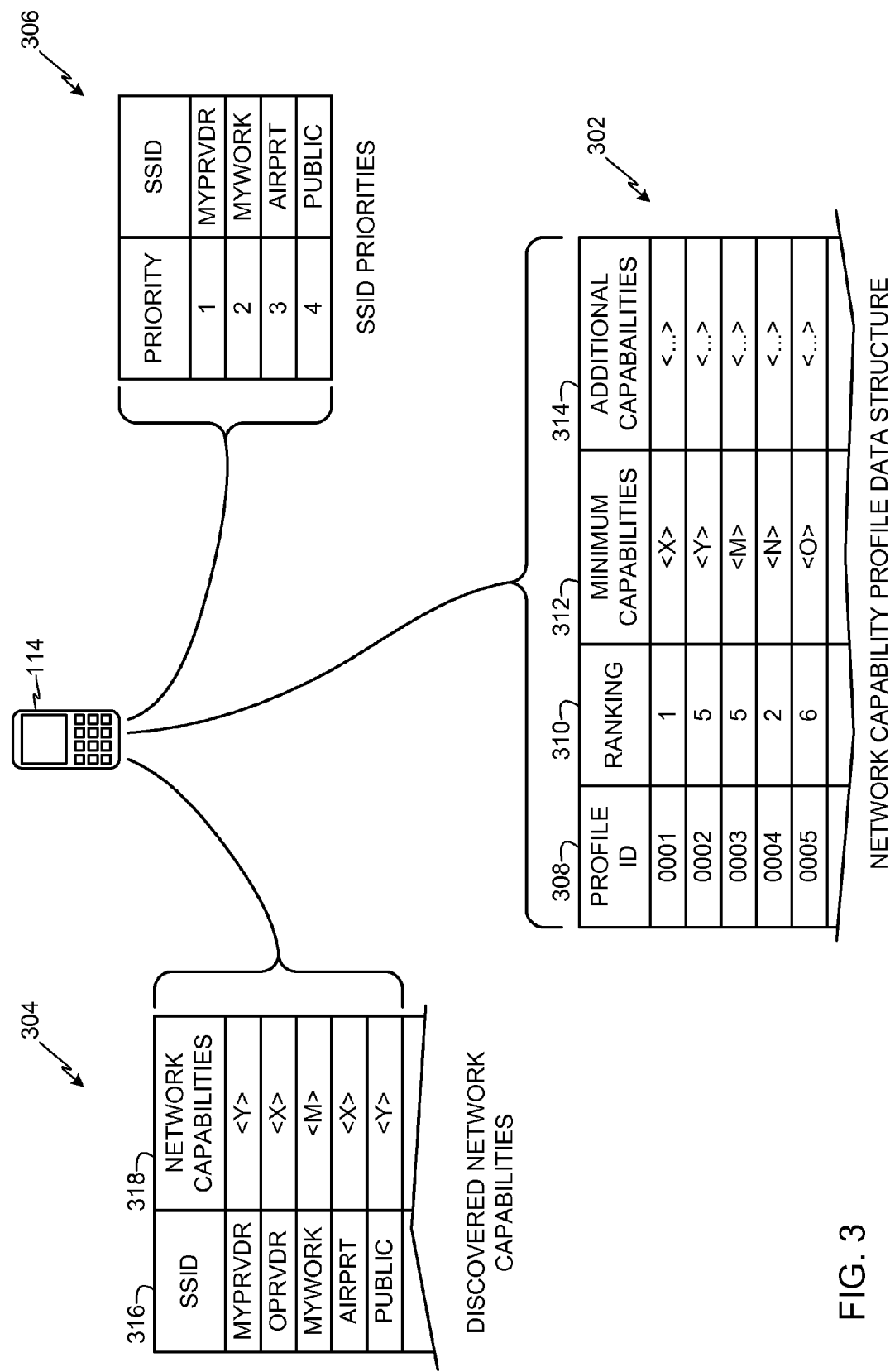
FIG. 3 depicts example data structures cached and/or stored in a wireless terminal to facilitate selecting wireless networks to join based on received network capabilities of those networks and network capabilities profiles associated with the wireless terminal.

Turning now to FIG. 3, the wireless terminal 114 caches and/or stores an example network capabilities profile data structure 302 having network capabilities profiles (e.g., the network capabilities profiles 210 of FIG. 2) specifying different sets of network capabilities. In the illustrated example, the wireless terminal 114 also caches discovered network capabilities 304 received from one or more wireless networks (e.g., wireless networks associated with the APs 104*a-c*) during a wireless network scan. In example implementations, the wireless terminal 114 uses the network capabilities profile data structure 302 and the discovered network capabilities 304 to select wireless networks to join based on network capabilities of discovered wireless networks (e.g., the discovered network capabilities 304) and network capabilities (e.g., one or more network capabilities specified in the network capabilities profile data structure 302) that are desired for use with the wireless terminal 114. In some example implementations, the wireless terminal 114 may also use a cached or stored SSID priority list 306 indicating a priority order of one or more SSIDs to select a wireless network to join when two or more wireless networks advertise network capabilities equally desired for use with the wireless terminal 114 (e.g., based on the network capabilities specified in the network capabilities profile data structure 302).

In the illustrated example of FIG. 3, each network capabilities profile in the network capabilities profile data structure 302 is assigned a unique profile ID 308 and includes rankings 310, minimum capabilities 312, and additional capabilities 314. Turning to the discovered network capabilities 304, during wireless network scans performed by the wireless terminal 114 to discover available WLANs (e.g., the access networks 106*a-c* of FIG. 1) in its vicinity, the wireless terminal 114 caches discovered SSIDs 316. For each discovered SSID 316, the wireless terminal 114 sends an ANQP query to each discovered WLAN requesting the network capabilities of those networks. The wireless terminal 114 then caches the received network capabilities 318 as shown in FIG. 3. In the illustrated example of FIG. 3, the cached network capabilities 318 are shown as <X>, <Y>, and <M> for each respective WLAN. Each notation <X>, <Y>, and <M> represents a listing of one or more network capabilities or services available via the respective WLAN.

Referring back to the network capabilities profile data structure 302, the minimum capabilities 312 are denoted as <X>, <Y>, <M>, <N>, and <O>, each of which indicates one or more network capabilities (for each profile) that must be available via a WLAN (e.g., the access network 106*a* of FIGS. 1 and 2) to consider that WLAN a suitable candidate for the wireless terminal 114 to join. For example, if discovered network capabilities (e.g., network capabilities <Y> cached in the discovered network capabilities 304) available via the access network A 106*a* do not meet the minimum network capabilities of profile ID 0001, then the access network A 106*a* would not be regarded as a suitable candidate based on the profile ID 0001. However, if the same discovered network capabilities (e.g., network capabilities <Y>) of the access network A 106*a* do meet the minimum network capabilities of profile ID 0002, then the access network A 106*a* would be regarded as a suitable candidate based on the profile ID 0002. Thus, network capabilities of a WLAN need to at least meet the minimum network capabilities of one network capabilities profile for that WLAN to be regarded as a suitable candidate for joining by the wireless terminal 114.

In the illustrated example of FIG. 3, the additional capabilities 314 specifies network capabilities for each network capabilities profile that are not necessarily required for a WLAN to be considered a suitable association candidate. However, the network capabilities specified in the additional capabilities 314 could be additional desired network capabilities. In some example implementations, the additional capabilities 314 may be used to select a WLAN that the wireless terminal 114 should join when multiple WLANs have been identified as suitable association candidates. For example, the wireless terminal 114 may discover the access network A 106*a* and the access network B 106*b* of FIG. 1 during the same network scan, and the access network A 106*a* may meet the minimum network capabilities requirements of profile ID 0001, while the access network B 106*b* may meet the minimum network capabilities requirements of profile ID 0002. In such an example, the wireless terminal 114 or a user of the wireless terminal 114 may select to connect to the access network A 106*a* if the network capabilities accessible via the access network A 106*a* match more of the network capabilities specified in the additional capabilities 314 for the profile ID 0001 than the quantity or percentage of matches between the network capabilities accessible via the access network B 106*b* and the additional capabilities 314 for the profile ID 0002.

In some example implementations, WLANs may be selected for association based on rankings of network capabilities profiles. In the illustrated example, the network capabilities profiles are assigned ranking values 310 to indicate their order of preference for use when selecting a WLAN from more than one suitable association candidate. The ranking values 310 may be specified by the wireless terminal 114 or by a SSP based on rules or criteria related to preferable wireless connections. Alternatively, the ranking values 310 may be specified by a user of the wireless terminal 114 based on wireless connection preferences of the user. During a network discovery process, when the wireless terminal 114 finds that more than one WLAN (e.g., the access networks A 106*a*, B 106*b*, and C 106*c*) is a suitable association candidate, the wireless terminal 114 may rank each of the WLANs based on the ranking values 310 assigned to corresponding ones of the network capabilities profiles that match those WLANs. For example, if network capabilities available via the access network A 106*a* align with the minimum capabilities 312 of the profile ID 0003 and the network capabilities of the access network B 106*b* align with the minimum capabilities 312 of the profile ID 0005, both of the access networks A 106*a* and B 106*b* are suitable association candidates, but the wireless terminal 114 selects the access network A 106*a* because the network capabilities profile (profile ID 0003) satisfied by the network capabilities of the access network A 106*a* has the higher capability ranking In the illustrated example, the wireless terminal 114 may use priorities of SSIDs listed in the SSID priorities table 306 to break a 'tie' when more than one discovered WLAN achieves the same one of the rankings 310. That is, if two WLANs with different SSIDs meet the minimum capabilities 312 of the same network capabilities profile, the wireless terminal 114 may select the WLAN having the highest priority SSID according the SSID priorities list 306.

Figure 4:
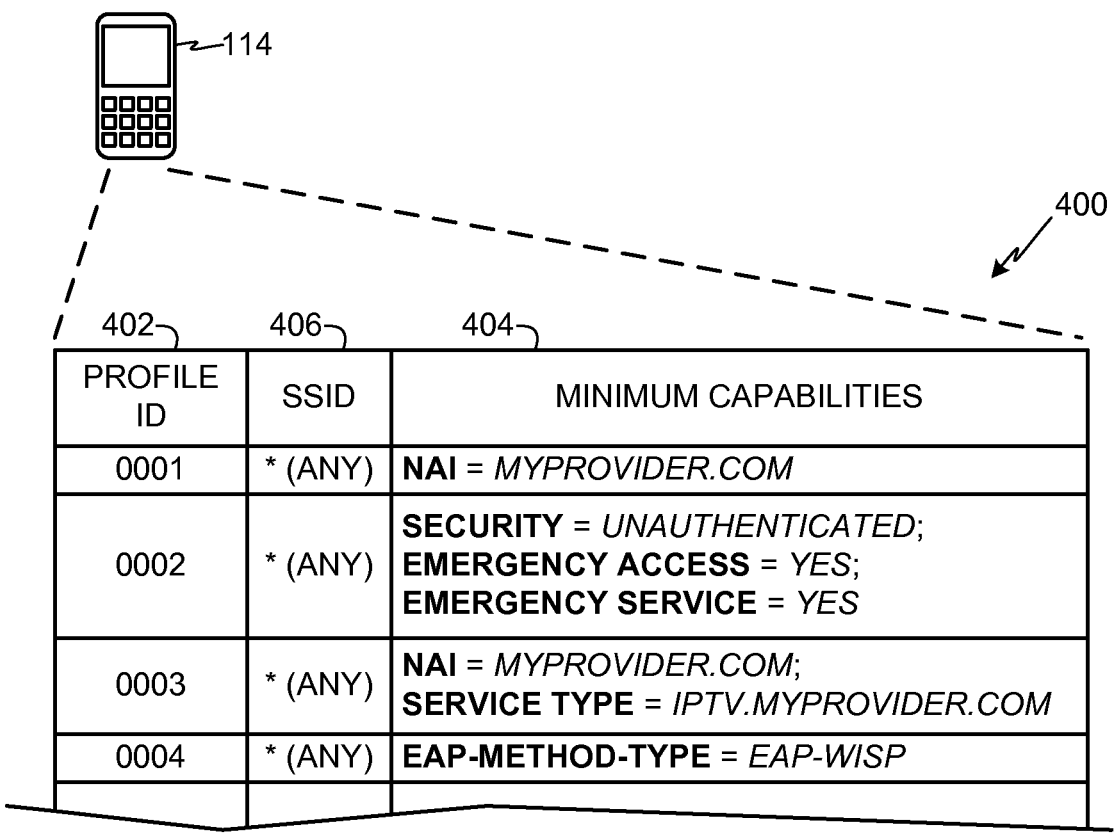
FIG. 4 depicts another example network capabilities profile data structure having network capabilities profiles defining different sets of network capabilities.

Turning now to FIG. 4, another example network capabilities profile data structure 400 is shown with example minimum network capabilities or services shown for each network capabilities profile. In addition, FIG. 4 shows that network capabilities profiles may be defined independent of network SSIDs. That is, unlike traditional network discovery techniques that rely on the SSID of a network to determine whether to join that network, the wireless terminal 114 may instead rely on the network capabilities of a WLAN exclusive of the SSID of the WLAN to determine whether the WLAN is a suitable candidate to join.

The network capabilities profile data structure 400 may be cached or stored in the wireless terminal 114. In the illustrated example of FIG. 4, the network capabilities profile data structure 400 stores a plurality of network capabilities profiles (e.g., the network capabilities profiles 210 of FIG. 2) specifying different sets of network capabilities. Each network capabilities profile is provided with a profile ID 402 and minimum capabilities 404 specifying the network capabilities required to recognize that a WLAN (e.g., any of the access networks 106*a-c* of FIG. 1) is available for associating with by the wireless terminal 114. For example, the network capabilities profile having profile ID 0001 requires only that a WLAN have a network access identifier (NAI) of 'MYPROVIDER.COM' to be considered a suitable association candidate for the wireless terminal 114. In such an example, 'MYPROVIDER.COM' may be the NAI of an SSP that provides a subscription service for the wireless terminal 114.

In the illustrated example, each of the network capabilities profiles is associated with a wildcard (*) as an SSID 406. The SSID wildcard (*) indicates that the SSID of a WLAN can be anything. That is, regardless of a particular SSID, the wireless terminal 114 can detect a WLAN as being available for association if the network capabilities available via the WLAN satisfy the network capabilities specified in the minimum capabilities 404 for any of the network capabilities profiles of the network capabilities profile data structure 400.

In some example implementations, the network capabilities profile data structure 400 may also be provided with ranking values such as the ranking values 310 of FIG. 3 and additional capabilities such as the additional capabilities 314 of FIG. 3.

Although not shown, the minimum capabilities 404 of FIG. 4 (and/or the minimum capabilities 312 of FIG. 3) may specify credentials for particular network services. For example, a roaming credential may be specified in a network capabilities profile indicating that, for that particular profile, a roaming network service of a wireless network must support roaming access to roam onto a network of an SSP indicated by the roaming credential. In such example implementations, if a network capabilities profile specifies a roaming credential as a minimum capability, the wireless terminal 114 must confirm that a WLAN supports roaming access to a SSP specified by the roaming credential of that profile. Otherwise, if roaming access corresponding to that roaming credential is not supported by a particular WLAN, the wireless terminal 114 will not consider that WLAN as a suitable candidate for joining Referring now to FIG. 5, an illustrated example of the wireless terminal 114 of FIGS. 1-4 is shown in block diagram form. In the illustrated example, the wireless terminal 114 includes a processor 502 that may be used to control the overall operation of the wireless terminal 114. The processor 502 may be implemented using a controller, a general purpose processor, a digital signal processor, dedicated hardware, or any combination thereof The wireless terminal 114 also includes a terminal message generator 504 and a terminal data parser 506. The terminal message generator 504 may be used to generate network capability discovery messages such as the NETCAP REQUEST 116 of FIGS. 1 and 2. The terminal data parser 506 may be used to retrieve information from memory (e.g., a RAM 510, a cache, etc.). For example, the terminal data parser 506 can retrieve SSIDs (e.g., the SSID 212 of FIG. 2), encryption mode statuses (e.g., the encryption mode status 214 of FIG. 2), GAS support indicators (e.g., the GAS support indicator 216 of FIG. 2) and network capabilities that are cached in the wireless terminal 114 after receiving them from a WLAN (e.g., the access networks 106*a-c* of FIG. 1).

Figure 5:
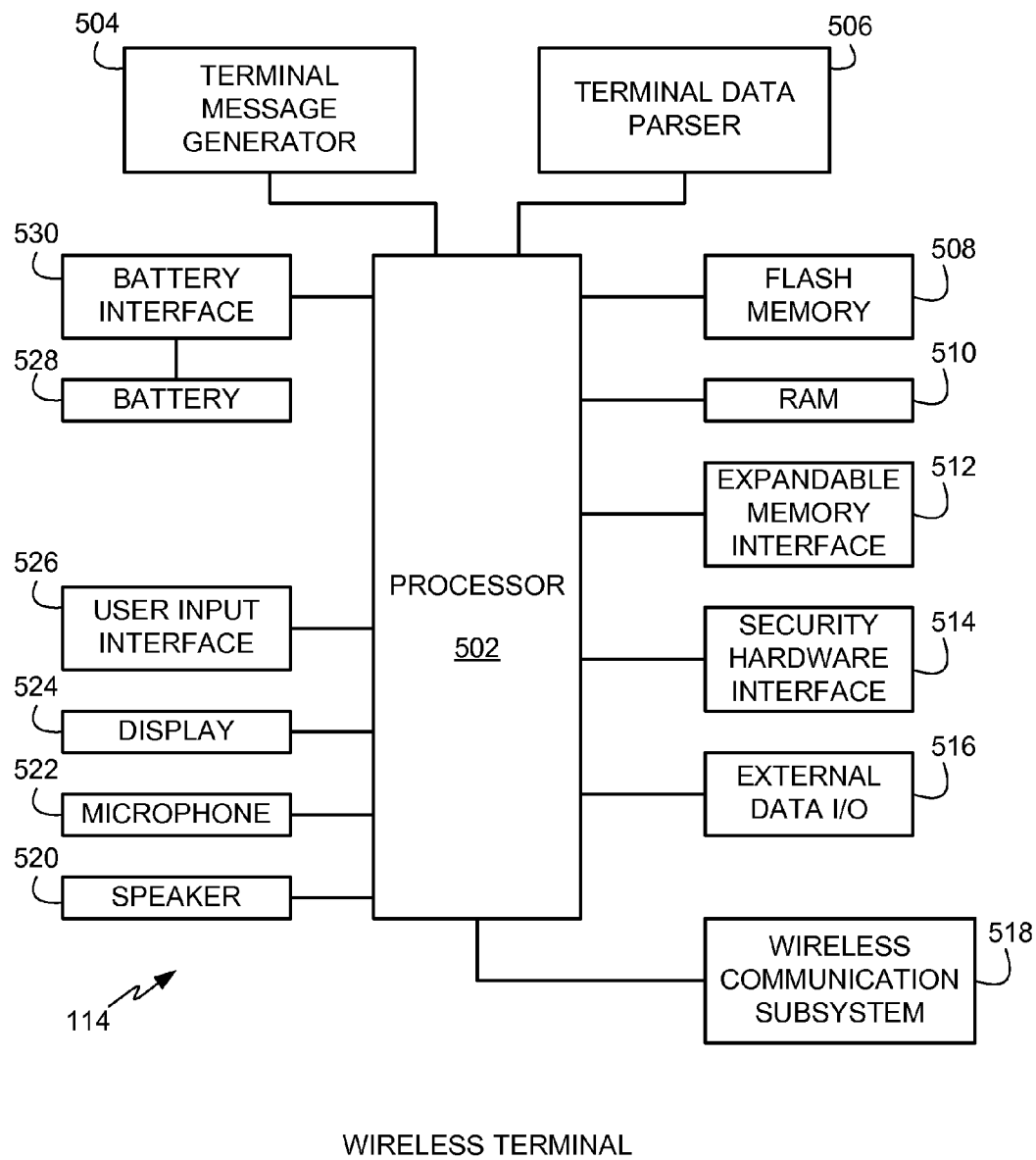
FIG. 5 depicts an example wireless terminal that may be used to implement the example methods and apparatus described herein.

Although the terminal message generator 504 and the terminal data parser 506 are shown as separate from and connected to the processor 502 in FIG. 5, in some example implementations, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any desired combination of hardware, firmware, and/or software. For example, one or more integrated circuits, discrete semiconductor components, and/or passive electronic components may be used. Thus, for example, the terminal message generator 504 and the terminal data parser 506, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 504 and the terminal data parser 506, or parts thereof, may be implemented using instructions, code, and/or other software and/or firmware, etc. stored on a machine accessible medium and executable by, for example, a processor (e.g., the example processor 502). When any of the appended claims are read to cover a purely software implementation, at least one of the terminal message generator 504 or the terminal data parser 506 is hereby expressly defined to include a tangible medium such as a solid state memory, a magnetic memory, a DVD, a CD, etc. As used herein, the term tangible computer readable medium is expressly defined to include any type of computer readable storage and to exclude propagating signals. Additionally or alternatively, at least one of the terminal message generator 504 or the terminal data parser 506 is hereby expressly defined to include a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example wireless terminal 114 shown in FIG. 5 also includes a FLASH memory 508, a random access memory (RAM) 510, and an expandable memory interface 512 communicatively coupled to the processor 502. The FLASH memory 508 can be used to, for example, store computer readable instructions and/or data. In some example implementations, the FLASH memory 508 can be used to store one or more of the data structures discussed above in connection with FIGS. 3 and 4. The RAM 510 can also be used to, for example, store data and/or instructions.

The wireless terminal 114 is provided with a security hardware interface 514 to receive a SIM card (or a USIM card or a NFC secure element) from a wireless service provider. A SIM card may be used as an authentication parameter to authenticate the wireless terminal 114 for establishing a connection with a WLAN-supported network. In some example implementations, a SIM card may also store registration information required to register with external networks. The wireless terminal 114 is also provided with an external data I/O interface 516. The external data I/O interface 516 may be used by a user to transfer information to the wireless terminal 114 through a wired medium.

The wireless terminal 114 is provided with a wireless communication subsystem 518 to enable wireless communications with APs (e.g., the APs 104*a-c* of FIG. 1). Although not shown, the wireless terminal 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 can be implemented using a BLUETOOTH® radio, a ZIGBEE® device, a wireless USB device, an ultra-wideband (UWB) radio, a Near Field Communications (NFC) device, or a Radio Frequency Identifier (RFID) device.

To enable a user to use and interact with or via the wireless terminal 114, the wireless terminal 114 is provided with a speaker 520, a microphone 522, a display 524, and a user input interface 526. The display 524 can be an LCD display, an e-paper display, etc. The user input interface 526 could be an alphanumeric keyboard and/or telephone-type keypad, a multi-direction actuator or roller wheel with dynamic button pressing capability, a touch panel, etc. As discussed above, the example methods and apparatus described herein can also be advantageously used in connection with wireless terminals that do not have user interfaces and, thus, the speaker, 520, the microphone 522, the display 524, the user input interface 526, and/or any combination thereof may be optionally omitted. In the illustrated example, the wireless terminal 114 is a battery-powered device and is, thus, provided with a battery 528 and a battery interface 530.

Figure 6:
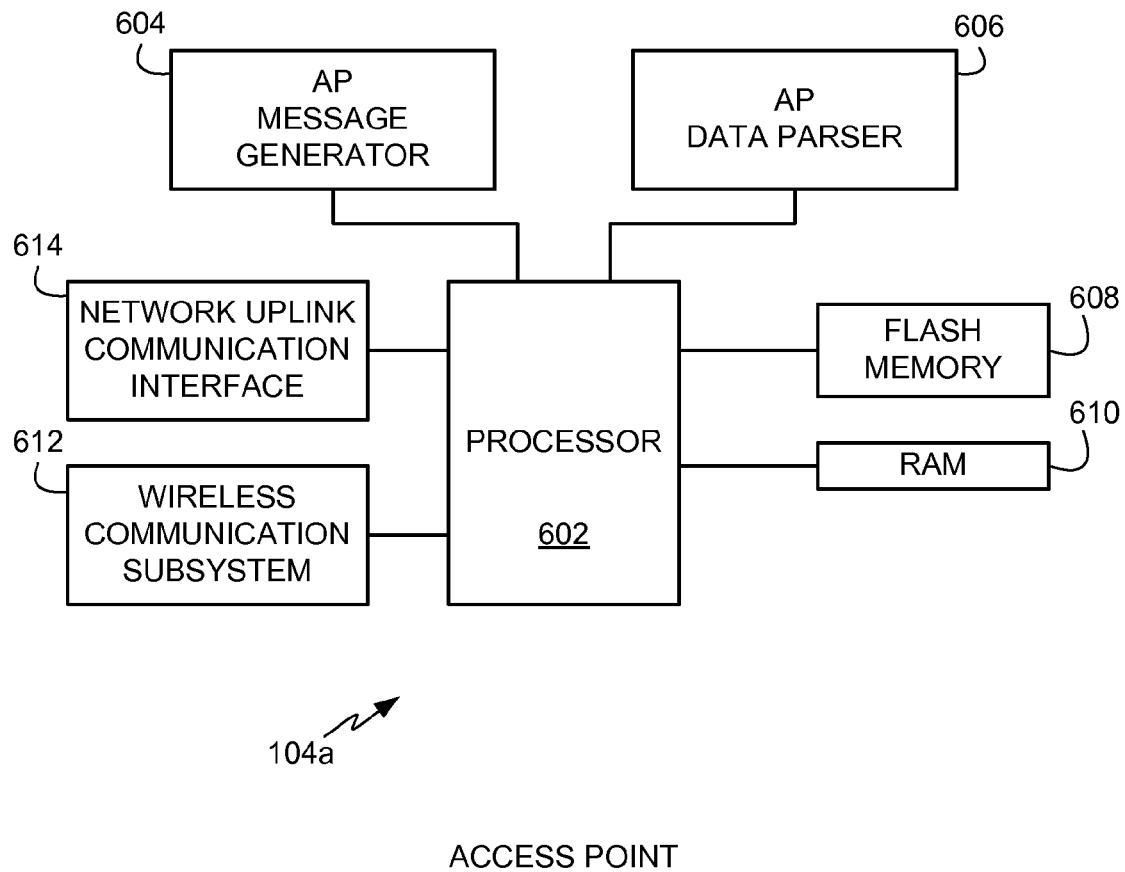
FIG. 6 depicts an example wireless access point that may be used to implement the example methods and apparatus described herein.

Turning now to FIG. 6, the example AP 104a of FIGS. 1 and 2 is shown in block diagram form. The APs 104b and 104c of FIG. 1 may be implemented using a substantially similar or identical configuration. The example AP 104a includes a processor 602 to perform the overall operations of the AP 104a. In addition, the AP 104a includes an AP message generator 604 to generate TLV or XML-formatted messages or messages of any other type of format (e.g., the NETCAP RESPONSE 118 of FIG. 1, the EXT-NETCAP REQUEST 218 of FIG. 2, and/or messages to send the SSID 212, the encryption mode status 214, and the GAS support indicator 216 of FIG. 2). The AP 104a also includes an AP data parser 606 to retrieve information from received messages sent by the wireless terminal 114 and/or the external network A 108a (FIGS. 1 and 2). The AP message generator 604 is substantially similar to the terminal message generator 504 of FIG. 5, and the AP data parser 606 is substantially similar to the terminal data parser 506 of FIG. 5. Thus, the AP message generator 604 and the AP data parser 606 may be implemented in the processor 602 and/or a wireless communication subsystem (e.g., a wireless communication subsystem 612) using any combination of hardware, firmware, and/or software including instructions stored on a tangible computer readable medium and/or a non-transitory computer readable medium.

The example AP 104a also includes a FLASH memory 608 and a RAM 610, both of which are coupled to the processor 602. The FLASH memory 608 may be configured to store network capabilities information (e.g., the access network capabilities data store 208 of FIG. 2). The RAM 610 may be used to generate messages for communication to the wireless terminal 114 and/or to the external network A 108a and/or to store received messages communicated by the wireless terminal 114 and/or the external network A 108a.

To communicate with wireless terminals such as the wireless terminal 114, the AP 104a is provided with a wireless communication subsystem 612, which may be substantially similar or identical to the wireless communication subsystem 518 (FIG. 5) of the wireless terminal 114. To communicate with a WLAN-supported network or external network (e.g., the networks 106a-c, 108a, and 108b of FIG. 1), the AP 104a is provided with a network uplink communication interface 614.

Figure 7A:
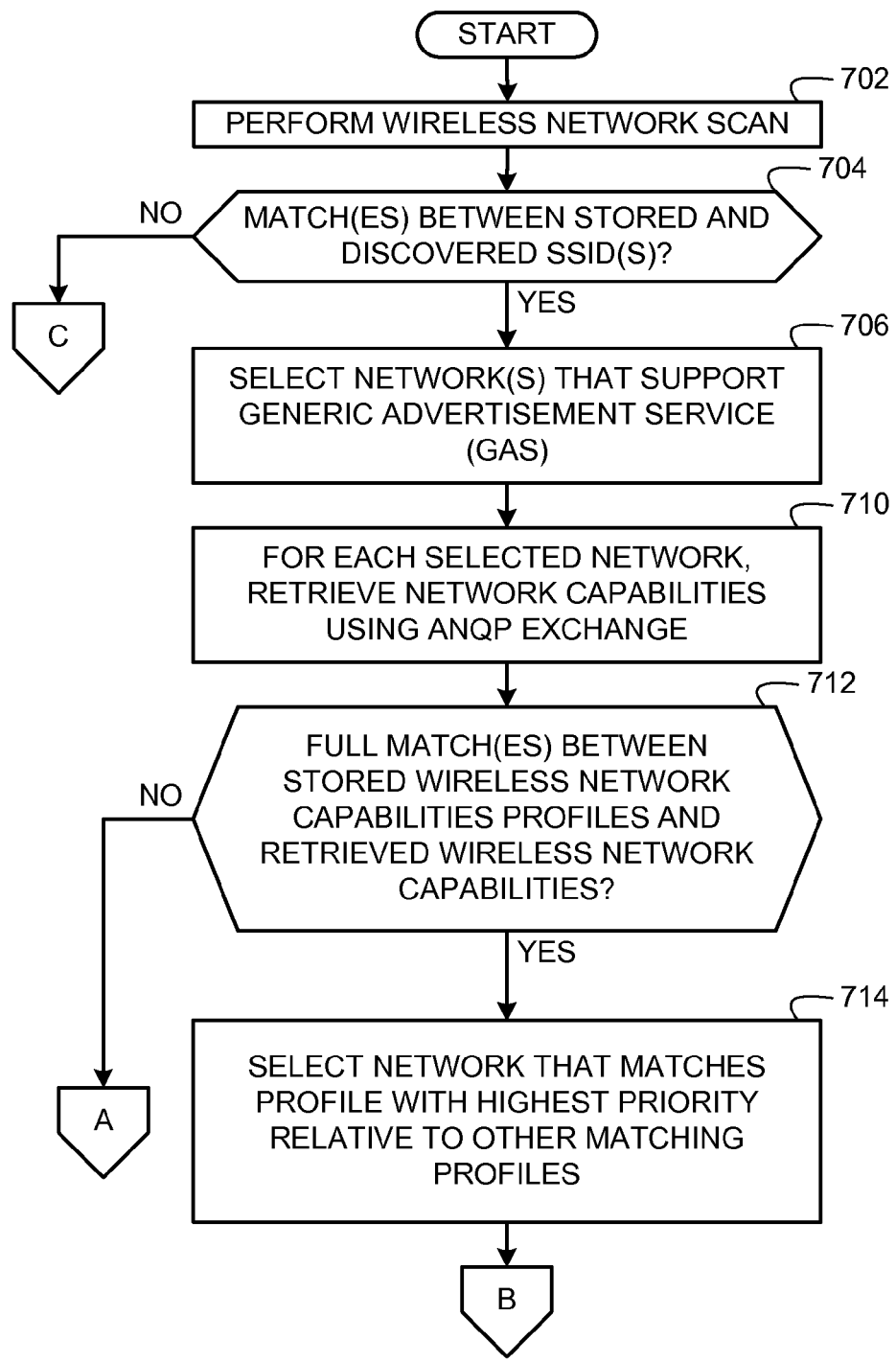
FIGS. 7A-7C depict a flow diagram representative of an example process that may be implemented by a wireless terminal to discover network capabilities available via one or more wireless local area networks.
Figure 7B:
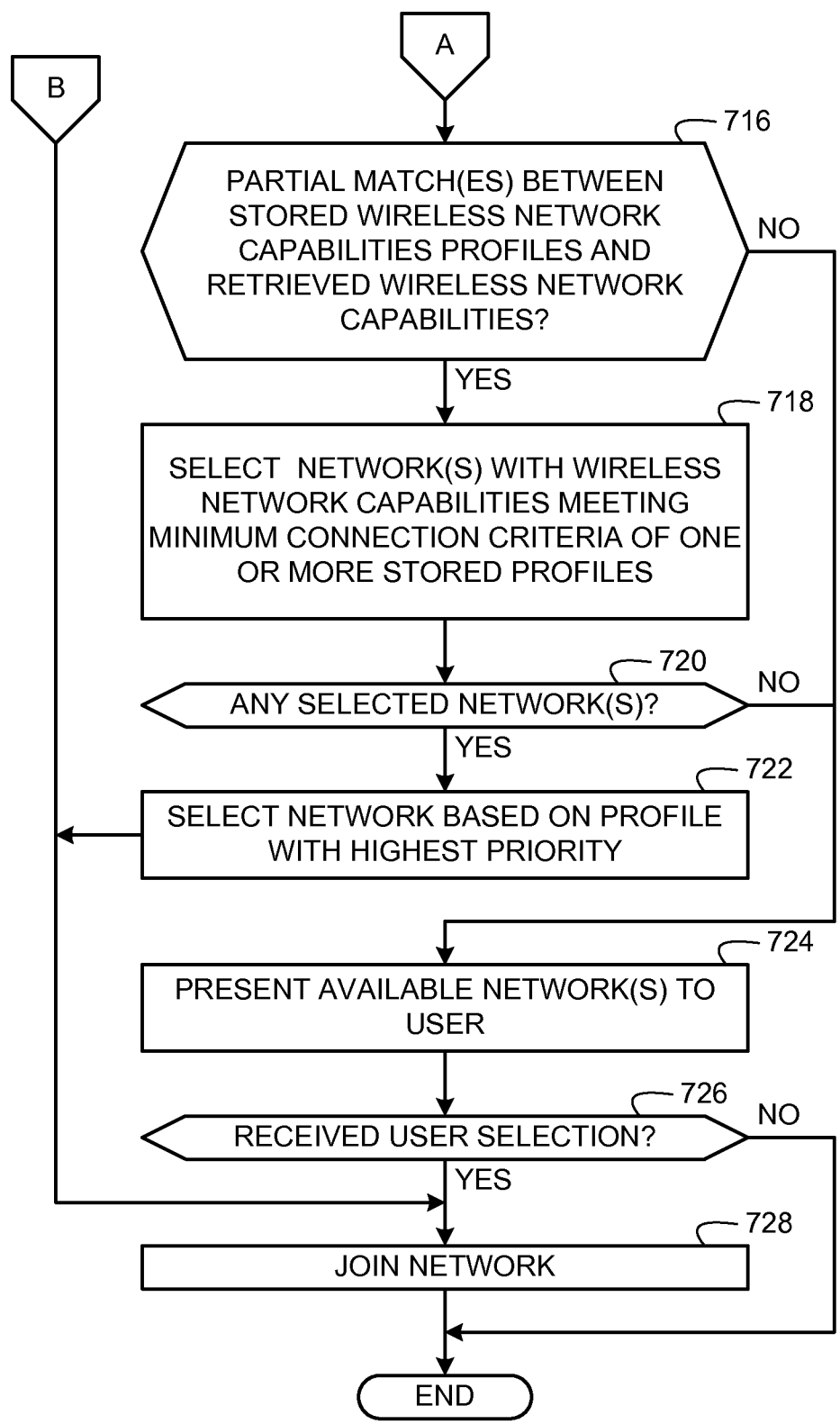
Figure 7C:
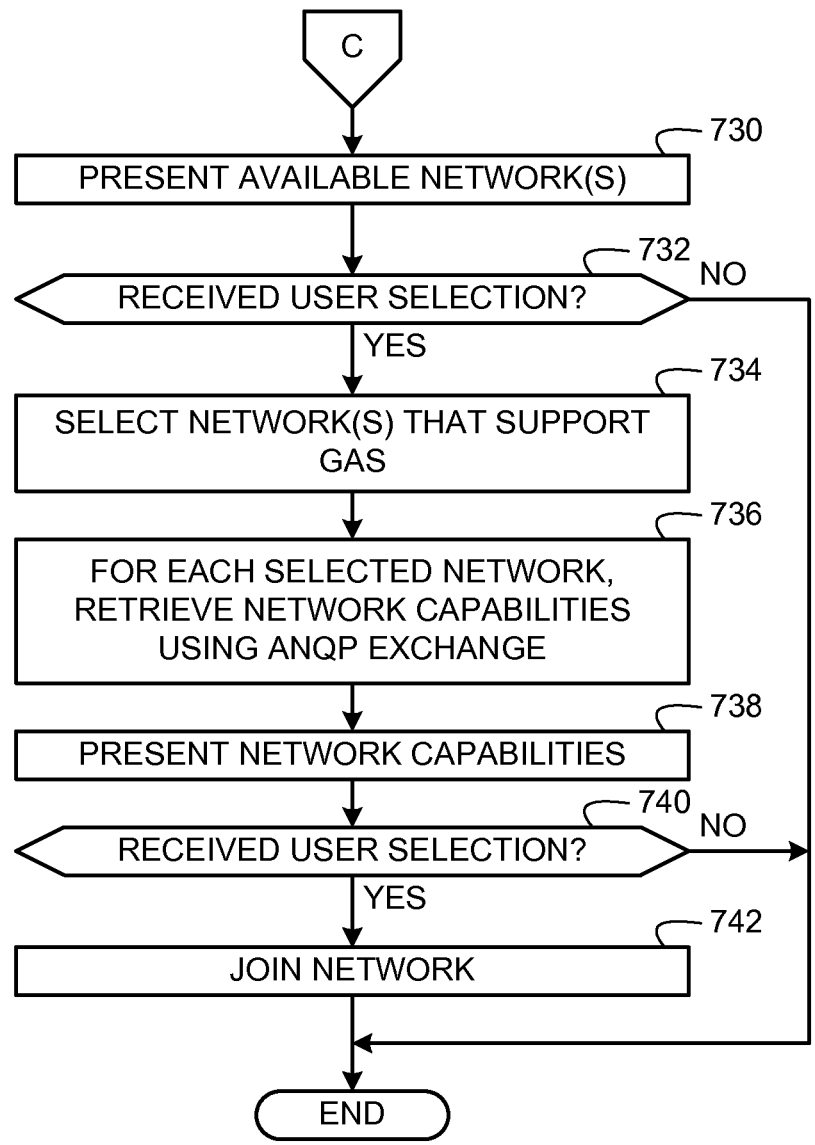
Figure 8:
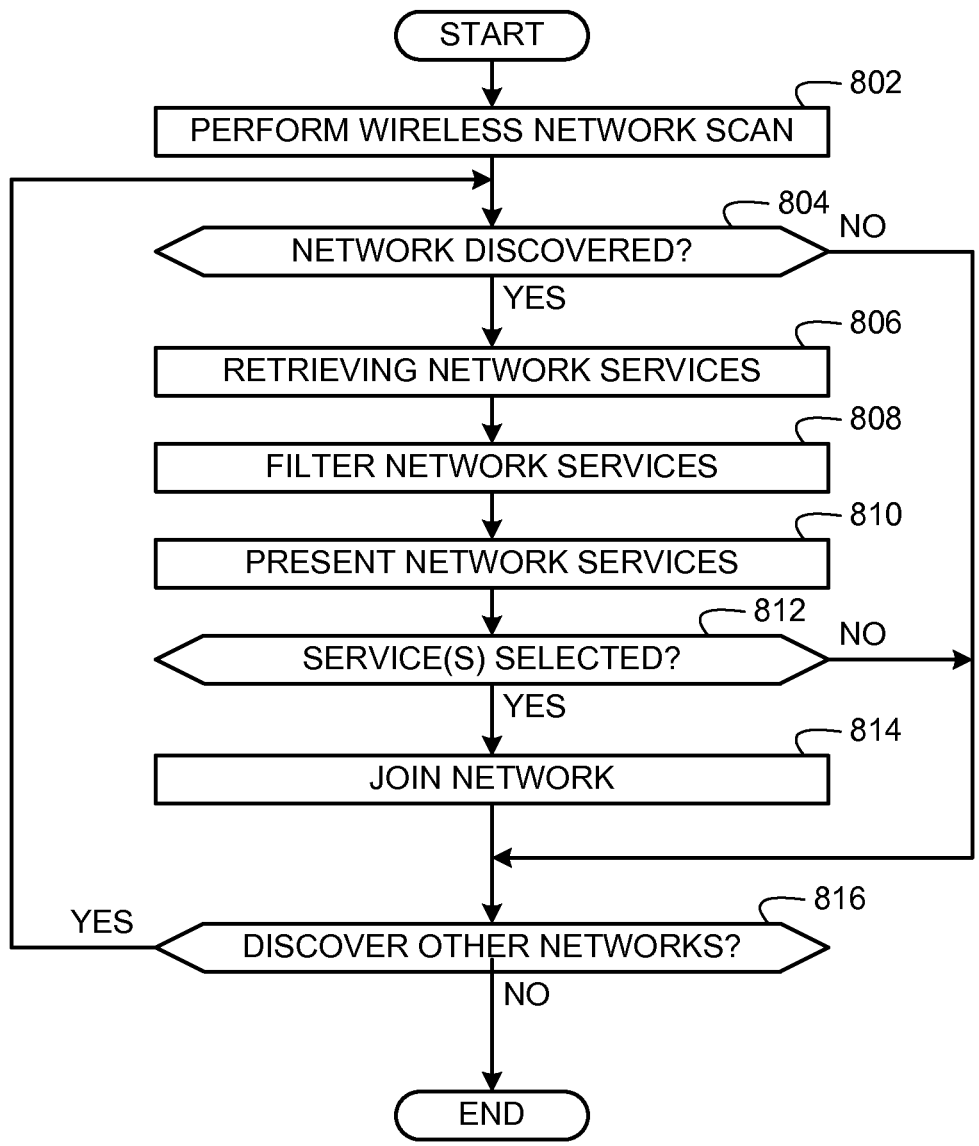
FIG. 8 depicts a flow diagram representative of another example process that may be implemented by the wireless terminal of FIGS. 1-5 to discover network capabilities available via one or more WLANs.
Figure 9:
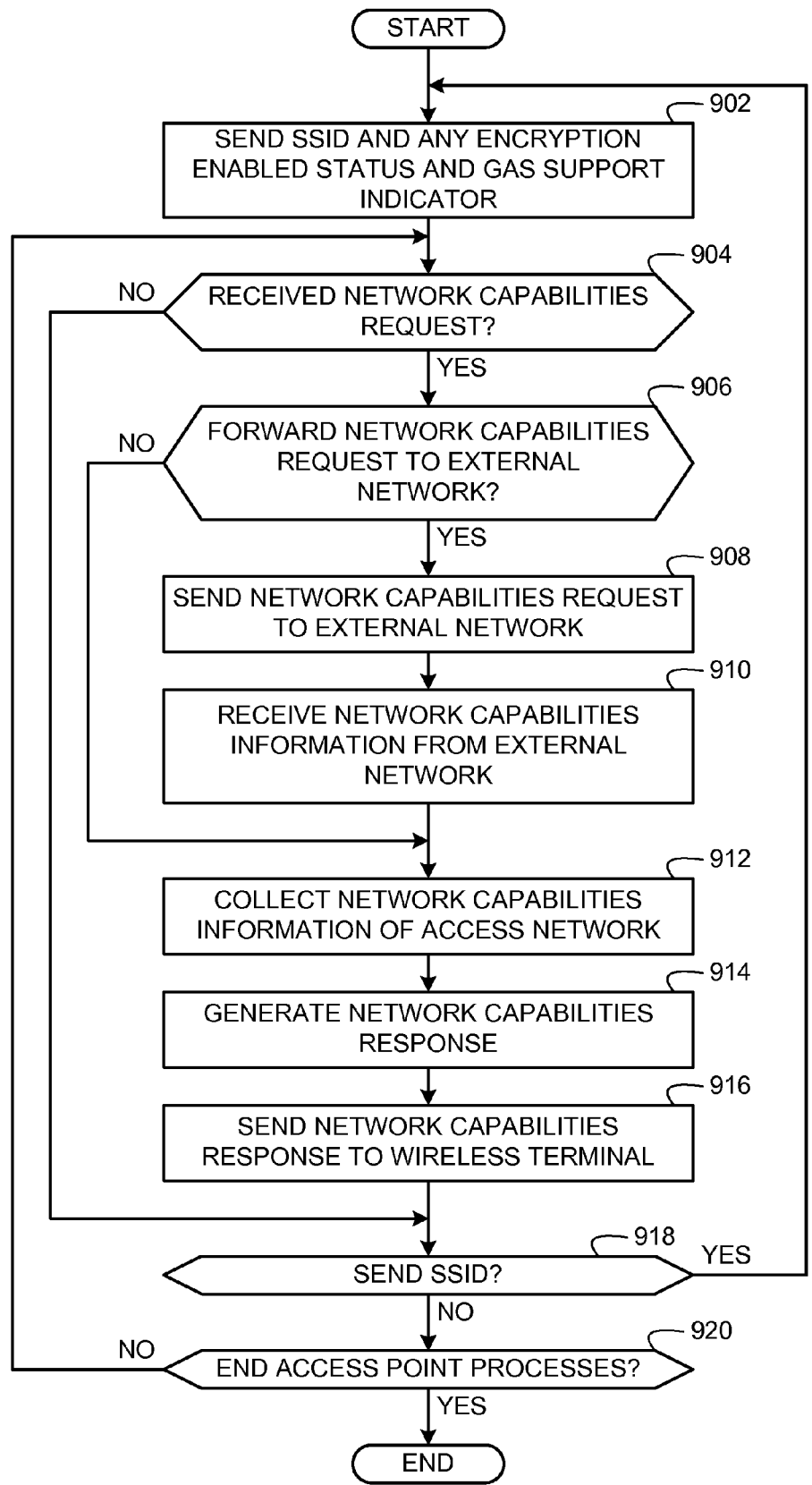
FIG. 9 depicts a flow diagram representative of an example process that may be implemented by a wireless local area network access point to send network capabilities information to a wireless terminal.

FIGS. 7A-7C depict a flow diagram representative of an example process that may be implemented by the wireless terminal 114 of FIGS. 1-5 to discover network capabilities available via one or more WLANs (e.g., the access networks 106a-c of FIGS. 1 and 2). FIG. 8 depicts a flow diagram representative of another example process that may be implemented by the wireless terminal 114 of FIGS. 1-5 to discover network capabilities via one or more WLANs. FIG. 9 depicts a flow diagram representative of an example process that may be implemented by an AP (e.g., one or more of the APs 104a-c of FIGS. 1 and 2) to send network capabilities information to the wireless terminal 114. The example processes of FIGS. 7A-7C, 8 and 9 may be performed using a processor, a controller and/or any other suitable processing device. For example, the example processes of FIGS. 7A-7C, 8, and 9 may be implemented using coded instructions (e.g., computer readable instructions) stored on a tangible computer readable medium such as a FLASH memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 7A-7C, 8, and 9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 7A-7C, 8, and 9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 7A-7C, 8, and 9 may be implemented manually or as any combination(s) of any of the foregoing techniques, for example, any combination of firmware, software, discrete logic and/or hardware. Further, although the example processes of FIGS. 7A-7C, 8, and 9 are described with reference to the flow diagrams of FIGS. 7A-7C, 8, and 9, other methods of implementing the processes of FIGS. 7A-7C, 8, and 9 may be employed. For example, the order of execution of the blocks may be changed, and/or some of the blocks described may be changed, eliminated, sub-divided, or combined. Additionally, any or all of the example processes of FIGS. 7A-7C, 8, and 9 may be performed sequentially and/or in parallel by, for example, separate processing threads, processors, devices, discrete logic, circuits, etc.

Turning now to FIG. 7A, the illustrated example process may be performed by the wireless terminal 114 during a network discovery process. Initially, the wireless terminal 114 performs a wireless network scan (block 702). For example, the wireless terminal 114 may perform a passive network scan in which it waits for one or more access points (e.g., one or more of the APs 104a-c of FIG. 1) to broadcast its SSID (e.g., the SSID 212 of FIG. 2) and encryption mode status (e.g., the encryption mode status 214 of FIG. 2), if applicable. Alternatively, the wireless terminal 114 may perform an active scan in which the wireless terminal 114 transmits a probe request to actively solicit SSIDs (and encryption mode status and GAS support indicators) of any nearby WLANs.

The wireless terminal 114 determines whether any of its stored SSIDs match any of the SSIDs received at block 702 (block 704). The stored SSIDs may be pre-stored by a user or a SSP or may have been previously stored by the wireless terminal 114 when received during a previous network discovery process. In some example implementations, the wireless network scan operations of blocks 702 and 704 may be omitted and the wireless terminal 114 may proceed to block 706 based on SSIDs that have been pre-stored in one of its memories (e.g., the FLASH memory 508 or the RAM 510 of FIG. 5).

Of the WLANs identified as having SSIDs that match SSIDs stored in the wireless terminal 114, the wireless terminal 114 selects the WLAN(s) that support(s) GAS (block 706). For example, during the wireless network scan of block 702, the wireless terminal 114 may receive GAS support indicators (e.g., the GAS support indicator 216 of FIG. 2) indicating which WLANs support GAS.

The wireless terminal 114 uses an ANQP exchange to retrieve network capabilities for each WLAN selected at block 706 (block 710). For example, for the WLAN associated with the AP 104a of FIGS. 1 and 2, the wireless terminal 114 sends the NETCAP REQUEST 116 to the AP 104a and the AP 104a responds with the NETCAP RESPONSE 118 as discussed above in connection with FIGS. 1 and 2. The wireless terminal 114 exchanges similar messages with any other WLAN selected at block 706.

The wireless terminal 114 determines whether any of the WLANs advertised network capabilities that fully matched all of the network capabilities (e.g., the minimum capabilities 312 and the additional capabilities 314 of FIG. 3) specified in a single network capabilities profile (e.g., the network capabilities profiles 210 of FIG. 2 and/or the network capabilities profiles of FIG. 3 and/or FIG. 4) (block 712). If the wireless terminal 114 finds full matches (block 712), the wireless terminal 114 selects the WLAN that advertised network capabilities matching the network capabilities profile with the highest ranking relative to other matching profiles (block 714). In some example implementations, the wireless terminal 114 may be configured to select a WLAN based on the network capabilities profile that has the relatively highest ranking and the closest proximity.

If at block 712, the wireless terminal 114 does not find any full matches, the wireless terminal 114 determines whether any of the WLANs advertised network capabilities that partially match the network capabilities specified in a single network profile (e.g., the network capabilities profiles 210 of FIG. 2 and/or the network capabilities profiles 302 of FIG. 3 and/or 400 of FIG. 4) (block 716) (FIG. 7B). If the wireless terminal 114 finds partial matches (block 716), the wireless terminal 114 selects the WLAN(s) that advertised network capabilities that matched at least all of the minimum capabilities (e.g., the minimum capabilities 312 of FIG. 3 or 404 of FIG. 4) of one or more network capabilities profile(s) (block 718). If the wireless terminal 114 selected any WLAN at block 720, the wireless terminal 114 then selects the WLAN that advertised network capabilities matching the minimum capabilities 312 (or the minimum capabilities 404) of a network capabilities profile with the highest ranking (block 722). In some example implementations, the wireless terminal 114 may be configured to select a WLAN based on the network capabilities profile that has the highest ranking and the closest proximity.

If the wireless terminal 114 did not select any WLAN at block 720 or if the wireless terminal 114 did not find any partial matches at block 716, the wireless terminal 114 presents the available WLAN(s) discovered at block 702 to a user (block 724). If the wireless terminal 114 receives a user selection of a WLAN (block 726) or if the wireless terminal 114 selects a WLAN at block 722 or if the wireless terminal 114 selects a WLAN at block 714 (FIG. 7A), the wireless terminal 114 joins with the selected WLAN (block 728). In some example implementations, after joining the selected WLAN (block 728), the wireless terminal 114 may also be registered with an external network (e.g., the external network A 108a of FIGS. 1 and 2). As shown in FIG. 7B, after joining the WLAN (block 728) or if the wireless terminal 114 did not receive a user selection of a WLAN (e.g., within a timeout period) at block 726, the example process of FIGS. 7A-7C ends.

Returning to FIG. 7A, if at block 704, the wireless terminal 114 does not find that any of its stored SSIDs match any of the SSIDs received at block 702, control advances to block 730 shown in FIG. 7C. The wireless terminal 114 presents the available WLAN(s) discovered at block 702 via a display of the wireless terminal 114 (block 730). If the wireless terminal 114 receives a user selection of one or more WLANs (block 732) that the user would like to attempt to join, the wireless terminal 114 selects the WLAN(s) that support(s) GAS (block 734). For example, the wireless terminal 114 may determine which WLANs support GAS based on which WLANs transmitted the GAS support indicator 216 (FIG. 2) (e.g., based on GAS support indicators received at block 702).

The wireless terminal 114 uses an ANQP exchange to retrieve network capabilities for each WLAN selected at block 734 (block 736). For example, for the WLAN associated with the AP 104a of FIGS. 1 and 2, the wireless terminal 114 sends the NETCAP REQUEST 116 to the AP 104a and the AP 104a responds with the NETCAP RESPONSE 118 as discussed above in connection with FIGS. 1 and 2. The wireless terminal 114 exchanges similar messages with any other WLAN selected at block 736.

The wireless terminal 114 presents the network capabilities retrieved at block 736 for each WLAN via a display of the wireless terminal 114 (block 738). If the wireless terminal 114 receives a user selection of a WLAN (block 740), the wireless terminal 114 joins the selected WLAN (block 742). In some example implementations, after joining the selected WLAN (block 742), the wireless terminal 114 may also be registered with an external network (e.g., the external network A 108a of FIGS. 1 and 2). As shown in FIG. 7C, after association with the selected WLAN (block 742) or if the wireless terminal 114 did not receive one or more user selection(s) of WLAN(s) at block 732 (e.g., within a particular timeout period) or did not receive a user selection at block 740 (e.g., within a particular timeout period), the example process of FIGS. 7A-7C ends.

Turning now to FIG. 8, the flow diagram depicts another example process that may be performed by the wireless terminal 114 of FIGS. 1-5 to discover network capabilities available via one or more WLANs. Initially, the wireless terminal 114 performs a wireless network scan (block 802). For example, the wireless terminal 114 may perform a passive network scan in which it waits for one or more access points (e.g., one or more of the APs 104a-c of FIG. 1) to broadcast its SSID (e.g., the SSID 212 of FIG. 2) and encryption mode status (e.g., the encryption mode status 214 of FIG. 2), if applicable. Alternatively, the wireless terminal 114 may perform an active scan in which the wireless terminal 114 transmits a probe request to actively solicit SSIDs (and encryption mode status and GAS support indicators) of any nearby WLANs.

If the wireless terminal 114 determines that one or more WLANs were discovered (block 804), the wireless terminal 114 retrieves network services for each discovered WLAN (block 806). For example, the wireless terminal 114 may use an ANQP exchange to retrieve the network services (e.g., the discovered network capabilities 304 of FIG. 3) for each discovered WLAN that supports GAS. The wireless terminal 114 filters the received network services (block 808). For example, the wireless terminal 114 may filter out any WLANs that do not meet the minimum network capabilities (e.g., the minimum capabilities 312 of FIG. 3 or 404 of FIG. 4) specified in the wireless terminal 114 and may further filter the remaining WLANs based on rankings (e.g., the rankings 310 of FIG. 3) associated with those minimum network capabilities. In this manner, the wireless terminal 114 can determine which of the WLANs are suitable candidates to join.

The wireless terminal 114 presents the network services via a display (block 810) for each WLAN that it identified as being a suitable candidate for joining If the wireless terminal 114 determines that one or more of the presented services were selected (e.g., by a user of the wireless terminal 114) (block 812), the wireless terminal 114 joins the WLAN that provides the one or more selected service(s) (block 814).

At some time after joining the WLAN at block 814, the wireless terminal 114 may determine whether it should discover other available networks (block 816). For example, the network capabilities needs of the wireless terminal 114 may change or the wireless terminal 114 may become disconnected from the WLAN that it joined at block 814. Additionally, the wireless terminal 114 may determine whether to discover other available networks at block 816 in instances when the wireless terminal 114 does not discover a network at block 804 or one or more services are not selected at block 812. If the wireless terminal 114 determines that it should discover another network (block 816), control passes back to block 804. Otherwise, the example process of FIG. 8 ends.

Turning now to FIG. 9, the illustrated example process may be performed by the AP 104a during a network discovery process. The example process may be similarly performed by any other AP (e.g., the APs 104b and 104c of FIG. 1 or any other AP) during a network discovery process. Initially, the AP 104a transmits its SSID (e.g., the SSID 212 of FIG. 2) and any encryption mode status (e.g., the encryption mode status 214 of FIG. 2) and GAS support indicator (e.g., the GAS support indicator 216 of FIG. 2) (block 902). The AP 104a may send this information based on a periodic SSID broadcast for passive network discovery scans or based on an active network discovery scan initiated by a wireless terminal (e.g., the wireless terminal 114 of FIGS. 1-5).

If the AP 104a receives a network capabilities request (e.g., the NETCAP REQUEST 116 of FIGS. 1 and 2) (block 906), the AP 104a determines whether to forward a network capabilities request (e.g., the EXT-NETCAP REQUEST 218 of FIG. 2) to an external network (e.g., the external network A 108a of FIGS. 1 and 2) (block 906). For example, if the AP 104a is in communication with an external network, it may send a network capabilities request to the external network. Otherwise, if it is not in communication with an external network, it does not send a network capabilities request to an external network.

If the AP 104a determines that it should send a network capabilities request to an external network (e.g., the external network A 108a) (block 906), the AP 104a sends the EXT-NETCAP REQUEST 218 to the external network A 108a (block 908) and receives the EXT-NETCAP RESPONSE 220 from the external network A 108a (block 910) including network capabilities of the external network A 108a as described above in connection with FIG. 2. After receiving the network capabilities of the external network A 108a at block 910 or if the AP 104a determines at block 906 that it should not send a network capabilities request to an external network, the AP 104a collects network capabilities of the access network A 106a (FIGS. 1 and 2) (block 912). The AP 104a generates the NETCAP RESPONSE 118 (FIGS. 1 and 2) (block 914) to include the network capabilities of the access network A 106a and/or the external network A 108a and sends the NETCAP RESPONSE 118 to the wireless terminal 114 (block 916).

After sending the NETCAP RESPONSE 118 at block 916 or if the AP 104a has not received the NETCAP REQUEST 116 at block 904, the AP 104a determines whether it should send another SSID (block 918), for example, based on a periodic SSID broadcast or a request from a wireless terminal. If the AP 104a determines that it should send another SSID, control returns to block 902. Otherwise, the AP 104a determines whether it should end its processes (block 920), for example, based on a power off event or a low-power mode event. If the AP 104a should not end its processes, control returns to block 904. Otherwise, the example process of FIG. 9 is ended.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for network selection, the method comprising:
discovering first network capabilities by performing an exchange between a wireless terminal and an access point of a wireless local area network;
comparing the first network capabilities with cached capabilities;
finding a match between at least a portion of the first network capabilities and at least a portion of the cached capabilities;
filtering the matched capabilities at the wireless terminal based on a ranking, the filtering of the matched capabilities comprising filtering out one of the matched capabilities based on the ranking; and
joining the wireless terminal with the access point based on at least a portion of the first network capabilities matching at least a portion of the cached capabilities.

2. A method as defined in claim 1, further comprising, prior to performing the exchange between the wireless terminal and the access point:
scanning for available networks; and
determining whether the access point supports a Generic Advertisement Service (GAS).

3. A method as defined in claim 2, wherein the GAS carries query protocols.

4. A method as defined in claim 3, wherein one of the query protocols is Access Network Query Protocol (ANQP).

5. A method as defined in claim 2, wherein the exchange between the wireless terminal and the access point is performed based on determining that the access point supports the GAS.

6. A method as defined in claim 2, wherein the exchange between the wireless terminal and the access point of the wireless local area network is performed using the GAS.

7. A method as defined in claim 1, wherein the exchange between the wireless terminal and the access point is a GAS exchange.

8. A method as defined in claim 1, wherein the first network capabilities include at least one of a roaming policy, a roaming credential, a supported emergency service, or access to a subscription service provider network.

9. A method as defined in claim 1, wherein the ranking assigned to the cached capabilities pertains to the wireless terminal.

10. A method as defined in claim 1, wherein the connection between the wireless terminal and the access point is established based on at least one of the matched capabilities being the highest ranked relative to others of the matched capabilities.

11. A method as defined in claim 1, wherein the exchange between the wireless terminal and the access point is performed in response to a first service set identifier (SSID) of the access point matching a second SSID cached in the wireless terminal.

12. A method as defined in claim 1, wherein the exchange between the wireless terminal and the access point to discover the first network capabilities is performed prior to joining the wireless terminal with an external network in communication with the access point.

13. An apparatus to select networks, comprising:
a processor configured to:
discover first network capabilities by performing an exchange between a wireless terminal and an access point of a wireless local area network;
compare the first network capabilities with cached capabilities;
find a match between at least a portion of the first network capabilities and at least a portion of the cached capabilities; and
filter the matched capabilities at the wireless terminal based on a ranking, the filtering of the matched capabilities comprising filtering out one of the matched capablities based on the ranking;
join the wireless terminal with the access point based on at least a portion of the first network capabilities matching at least a portion of the cached capabilities.

14. An apparatus as defined in claim 13, wherein the processor is to, prior to performing the exchange between the wireless terminal and the access point:
scan for available networks; and
determine whether the access point supports a Generic Advertisement Service (GAS).

15. An apparatus as defined in claim 14, wherein the GAS carries query protocols.

16. An apparatus as defined in claim 15, wherein one of the query protocols is Access Network Query Protocol (ANQP).

17. An apparatus as defined in claim 14, wherein the processor is to perform the exchange between the wireless terminal and the access point based on determining that the access point supports the GAS.

18. An apparatus as defined in claim 14, wherein the processor is to perform the exchange between the wireless terminal and the access point of the wireless local area network using the GAS.

19. An apparatus as defined in claim 13, wherein the processor is to perform the exchange between the wireless terminal and the access point using a GAS exchange.

20. An apparatus as defined in claim 13, wherein the first network capabilities include at least one of a roaming policy, a roaming credential, a supported emergency service, or access to a subscription service provider network.

21. An apparatus as defined in claim 13, wherein the ranking assigned to the cached capabilities pertains to the wireless terminal.

22. An apparatus as defined in claim 13, wherein the processor is to establish the connection between the wireless terminal and the access point based on at least one of the matched capabilities being the highest ranked relative to others of the matched capabilities.

23. An apparatus as defined in claim 13, wherein the processor is to perform the exchange between the wireless terminal and the access point in response to a first service set identifier (SSID) of the access point matching a second SSID cached in the wireless terminal.

24. An apparatus as defined in claim 13, wherein the processor is to perform the exchange between the wireless terminal and the access point to discover the first network capabilities prior to joining the wireless terminal with an external network in communication with the access point.

* * * * *